United States Patent [19]

Fujimoto

[11] 4,327,583

[45] May 4, 1982

[54] WEATHER FORECASTING DEVICE

[75] Inventor: Toshio Fujimoto, Nishinomiya, Japan

[73] Assignee: Fujiya Kabushiki Kaisha, Osaka, Japan

[21] Appl. No.: 191,311

[22] Filed: Sep. 26, 1980

[30] Foreign Application Priority Data

May 7, 1980 [JP] Japan .............................. 55-62922[U]

[51] Int. Cl.³ .............................................. G01L 7/12
[52] U.S. Cl. ...................................... 73/386; 340/601
[58] Field of Search ..................... 73/386, 387, 170 R; 340/601

[56] References Cited

U.S. PATENT DOCUMENTS 3,273,398 9/1966 Sharp ..................................... 73/386
3,315,462 4/1967 Bosquet .............................. 340/601
3,623,051 11/1971 Juno et al. ............................ 340/601

FOREIGN PATENT DOCUMENTS 454443 10/1936 United Kingdom .................. 73/386
454931 10/1936 United Kingdom .................. 73/386

Primary Examiner—Donald O. Woodiel
Attorney, Agent, or Firm—Browdy and Neimark

[57] ABSTRACT

A weather forecasting device comprises a pair of contacts disposed a predetermined distance apart from each other and a switch plate disposed between the contacts. The switch plate is movable between the contacts in response to changes in atmospheric pressure and the manner of contact between the switch plate and the two contacts is used to detect the direction and amount of change in atmospheric pressure. On the basis of the results of such detection, probable weather changes are successively forecasted.

6 Claims, 9 Drawing Figures

WEATHER FORECASTING DEVICE

FIELD OF THE INVENTION

The present invention relates to a weather forecasting device which operates by detecting changes in atmospheric pressure. More particularly, the invention relates to a weather forecasting device which, while constantly measuring atmospheric pressure by a barometer, detects the turning point at which atmospheric pressure changes from rise to fall or from fall to rise and also detects the time when atmospheric pressure has changed by a predetermined amount from said turning point, so that on the basis of the results of such detection, probable weather changes are successively forecasted.

BACKGROUND OF THE INVENTION

A weather forecasting device using a barometer which has a pointer to indicate a value of atmospheric pressure at a particular point of time on the dial has already been proposed, wherein an auxiliary pointer is installed coaxially with said main pointer and adapted to be manually moved to overlap said main pointer so that upon lapse of a given period of time, the atmospheric pressure change produced during that time can be known by the difference between the atmospheric pressure values indicated by the auxiliary and main pointers, on the basis of which difference a probable weather change is forecasted. With this conventional weather forecasting device, however, it is only possible to know the difference between the value of atmospheric pressure which exists when the auxiliary pointer is manually set and the value of atmospheric pressure which exists at the present point of time, and it is impossible to know with certainty the present tendency of atmospheric pressure change, that is, whether atmospheric pressure is rising or falling, so that the weather forecast coming-true probability is relatively low.

SUMMARY OF THE INVENTION

An object of the invention is to provide a weather forecasting device which measures even-changing atmospheric pressure by means of a barometer and accurately detects atmospheric pressure changes, or whether atmospheric pressure is changing from rising tendency to falling tendency or from falling tendency to rising tendency, thereby giving accurate weather forecasts.

Another object of the invention is to provide a weather forecasting device which detects the turning point of atmospheric pressure change and the point to which atmospheric pressure has changed by a predetermined amount from said turning point, so that on the basis of the results of such detection, probable weather changes can be successively forecasted.

A further object of the invention is to provide a weather forecasting device which is simple in construction and easy to produce and which is highly accurate and of stabilized quality.

DESCRIPTION OF THE PREFERRED EMBODIMENT

Figure 1:
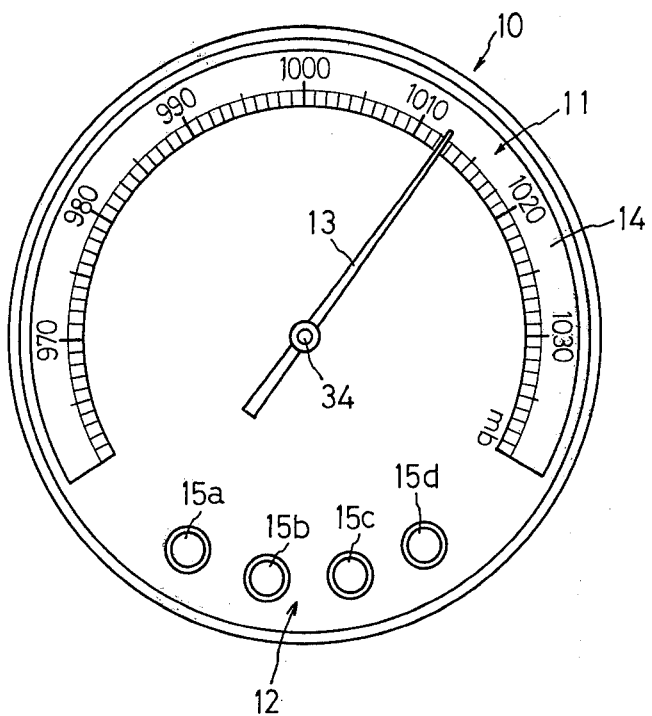
FIG. 1 is a front view of an embodiment of a weather forecasting device of the invention.
Figure 2:
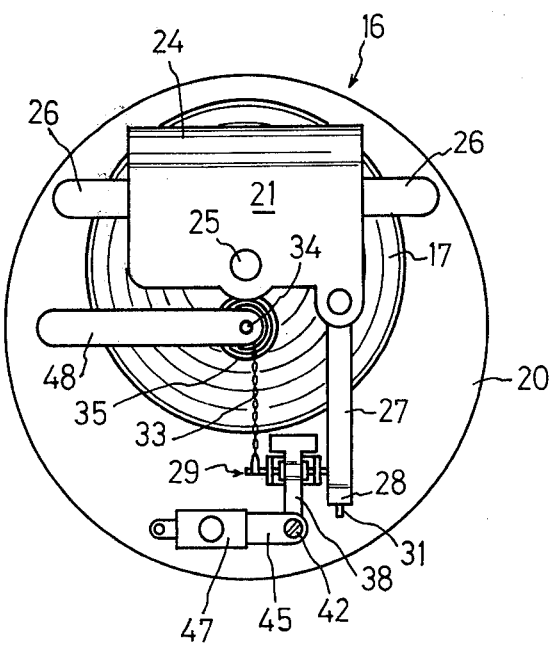
FIG. 2 is a front view of the internal mechanism of the embodiment shown in FIG. 1.
Figure 3:
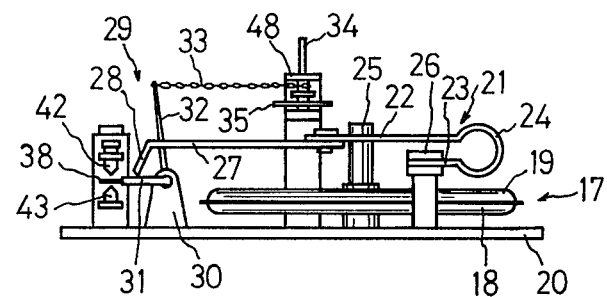
FIG. 3 is a side view of the internal mechanism of FIG. 2.

An embodiment of a weather forecasting device of this invention will now be described with reference to the accompanying drawings. As shown in FIG. 1, a weather forecasting device 10 has an atmospheric pressure indicating section 11 and a weather forecast representing section 12 on the meter face. The atmospheric pressure indicating section 11 comprises a pointer 13 and a dial 14. The pointer 13 is adapted to rotate according to changes in atmospheric pressure and indicate a point on the dial 14 so as to indicate the value of atmospheric pressure at that time. The weather forecast representing section 12 comprises four lamps 15 to represent weather forecasts in four steps. The four-step weather representation is such that, for example, the lighting of the lamp 15a represents "it will be fine", the lighting of the lamp 15b represents "atmospheric pressure is rising" or "the weather will improve", the lighting of the lamp 15c represents "atmospheric presssure is falling" or "the weather will get bad", and the lighting of the lamp 15d represents "it will rain". The internal construction of the weather forecasting device 10 will be described with reference to FIGS. 2 and 3. The barometer 16 used in this weather forecasting device 10 is the aneroid type barometer. The aneroid type barometer is also called the chamber type barometer. The aneroid type barometer has a hollow assembly 17 which detects atmospheric pressure. The hollow assembly 17 is defined by two circular corrugated plates 18 and 19 put together, with the peripheral edge thereof being hermetically bonded together, the interior being evacuated, so that the two corrugated plates 18 and 19 move toward and away from each other. One corrugated plate 18 of the hollow assembly 17 is fixed at its center to a base plate 20. The other corrugated plate 19 has the free end 22 of a spring 21 attached thereto by an attaching member 25. The spring 21 has a bend 24 and is fixed at the other end thereof to the base plate 20 by a fixing member 26. Accordingly, the corrugated plate 19 of the hollow assembly 17 is subjected to a resilient force exerted by the spring 21, so that atmospheric pressure is balanced by the resilient force possessed by the hollow assembly 17 itself and the resilient force possessed by the spring 21. Thus, as atmospheric pressure increases to exert a greater pressure on the hollow assembly 17, the corrugated plate 19 moves toward the corrugated plate 18. Conversely, as atmospheric pressure decreases, the corrugated plate 19 moves away from the corrugated plate 18. The free end 22 of the spring 21 is attached to a transmission lever 27, which moves in operative connection with the movement of the corrugated plate 19 to transmit the state of the corrugated plate 19 to a bell crank 29. The bell crank 29 is attached to the base plate 20 by an attaching member 30. One arm 31 of the bell crank 29 is engaged by the front end 28 of the transmission lever 27, so that the bell crank 29 is operated by the movement of the transmission lever 27. The other arm 32 of the bell crank 29 has a chain 33 attached thereto, said chain being connected at the other end to the shaft 34 of the pointer 13 supported by a fixed member 48. A spiral spring 35 is attached to the shaft 34 to constantly urge the pointer 13 in the returning direction. Therefore, the state of the hollow assembly 17 operable by atmospheric pressure is transmitted to the bell crank 29 through the transmission lever 27 and then to the shaft 34 through the chain 33, so that the pointer 13 is rotated to indicate the value of atmospheric pressure on the dial 14 at that time. Displacement of the hollow assembly 17 is not necessarily proportional to changes in atmospheric pressure. Therefore, care must be taken in determining the position at which the transmission lever 27 pushes the arm 31 of the bell crank 29 and the angle formed between the arms 31 and 32 of the bell crank 29 so that the pointer 13 rotates in exact proportion to changes in atmospheric pressure, thus indicating the value of atmospheric pressure at that time on the dial 14.

Figure 4:
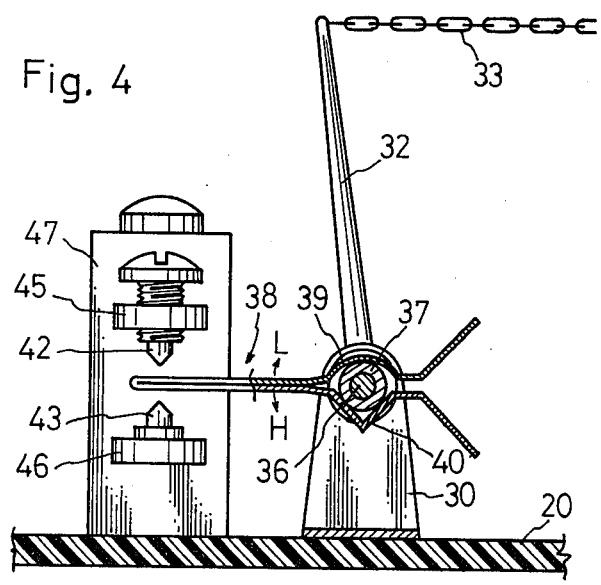
FIG. 4 is a side view, partly in section, showing, on an enlarged scale, a switch plate and contacts.
Figure 5:
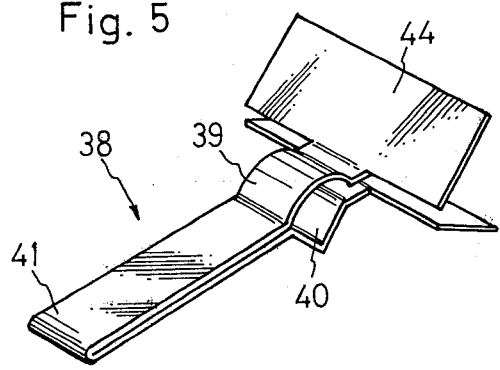
FIG. 5 is an enlarged perspective view of the switch plate.
Figure 6:
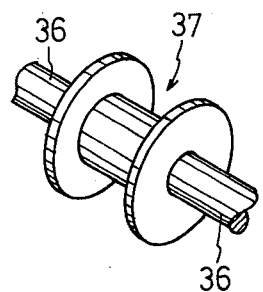
FIG. 6 is an enlarged perspective view of a grooved pulley.

As shown in detail in FIGS. 4, 5 and 6, a grooved pulley 37 is fixed on the shaft 36 of the bell crank 29, so that the grooved pulley rotates in operative connection with the rotation of the bell crank 29. A switch plate 38 is made of a material which possesses both electric conductivity and resilience. The switch plate 38 is in the form of a plate folded double. The central portion of the switch plate 38 is formed with bulges 39 and 40 for clamping the grooved pulley 37, whereby the switch plate is mounted on the grooved pulley 37. One bulge 39 of the switch plate 38 is arcuate with a radius of curvature greater than that of the lateral surface of the grooved pulley 37, while the other bulge 40 is triangular. The two bulges clamp the grooved pulley 37 with suitable resilience. With the shape of the bulges illustrated, that is, one is arcuate and the other is triangular, the bulges contact the grooved pulley at three points. Since the bulges 39 and 40 clamp the grooved pulley 37 with suitable resilience, slippage will not occur in the contact region under small forces but will occur in the contact region only when a force greater than a fixed value acts thereon. The front end 41 of the switch plate 38 defines a region of contact with electric contacts 42 and 43. The rear portion of the switch plate 38 terminates in large plate-like portions 44 for establishing balance in weight on both sides of the bulges, which serve as the fulcrum. The upper and lower plate-like portions 44 are opened wide to facilitate the mounting of the switch plate 38 on the grooved pulley 37. The contacts 42 and 43 are disposed one above the other with a given distance maintained therebetween and the switch plate 38 has its front end interposed between said contacts 42 and 43. The contacts 42 and 43 are attached to arms 45 and 46, respectively. The upper arm 45 and the contact 42 are threadedly connected together, so that the contact 42 is vertically movable. The lower contact 43 is fixed to the arm 46. Therefore, it is possible to adjust the distance between the contacts by vertically moving the contact 42. The front ends of the contacts 42 and 43 are pointed to provide for a minimum of probability of poor electric conduction due to adhesion of foreign matter to the contacts and for a concentration of pressure when the switch plate 38 comes in contact with the contacts 42 and 43. The arms 45 and 46 are fixed to a support member 47 of insulating material fixed to the base plate 16.

Figure 7:
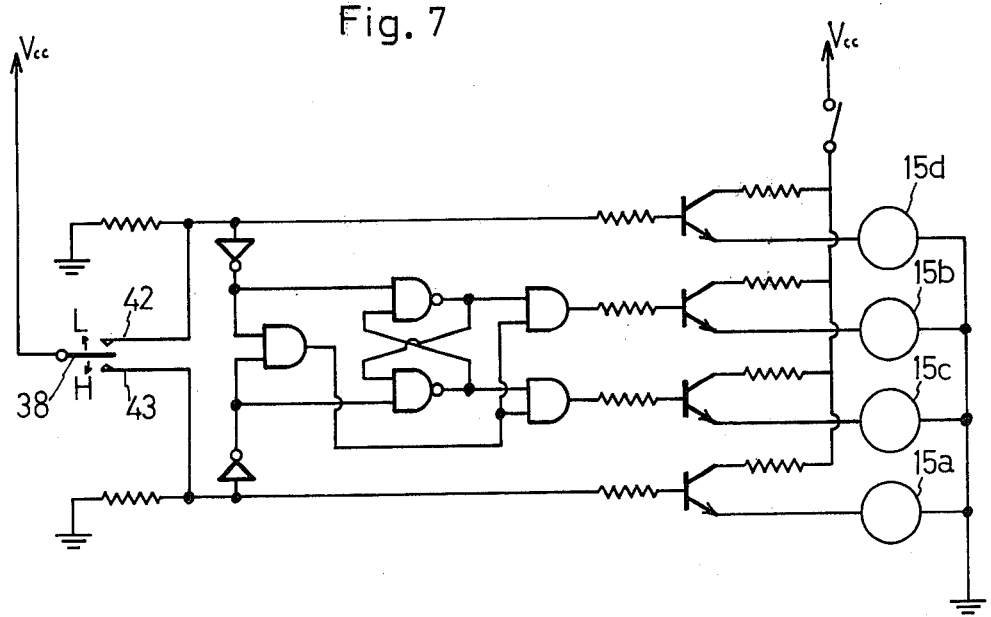
FIG. 7 is an electric circuit diagram.

The switch which comprises the switch plate 38 and contacts 42 and 43 is incorporated in the electric circuitry shown in FIG. 7. This electric circuitry uses integrated circuits and transisters and is so designed that the four lamps 15 can be individually lighted according to the state of contact between the switch plate 38 and the contacts 42 and 43. Thus, when the switch plate 38 comes in contact with the contact 43, the lamp 15a is lighted to represent "it will be fine", when the switch plate 38 leaves the contact 43, the lamp 15c is lighted to represent "atmospheric pressure is falling", when the switch plate 38 comes in contact with the contact 42, the lamp 15d is lighted to represent "it will rain", and when the switch plate 38 leaves the contact 42, the lamp 15b is lighted to represent "atmospheric pressure is rising".

The distance between the contact 42 and 43 is so adjusted that after leaving one of the contacts, the switch plate 38 comes in contact with the other contact if there is a change in atmospheric pressure which is at least 3 mb. After the switch comes in contact with either of the contacts, slippage will occur between the bulges and the grooved pulley 37 if there is a change in atmospheric pressure which is at least 1 mb.

Figure 8:
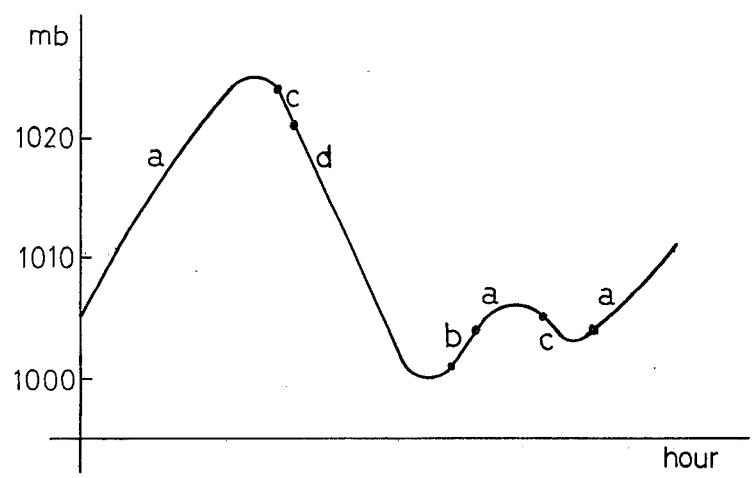
FIG. 8 is a graph showing atmospheric pressure changes.

How the lamps 15 are lighted according to actual changes in atmospheric pressure will now be described with reference to FIG. 8.

If atmospheric pressure rises, the hollow assembly 17 is further compressed and this compressive movement is transmitted to the bell crank 29 through the transmission lever 27, whereby the shaft 36 together with the grooved pulley 37 is rotated in a direction H. As a result, the switch plate 38 comes in contact with the contact 43 to light the lamp 15a, representing "it will be fine". Simultaneously therewith, the chain 33 is pulled by an amount corresponding to the amount of rotation of the bell crank 29 to rotate the pointer 13 which then indicates the value of atmospheric pressure at that time on the dial 14. If atmospheric pressure continues to rise after the lamp 15a is lighted, the bell crank 29 is further rotated according to compression of the hollow assembly 17, so that the switch plate 38 further receives a torque through the grooved pulley 37 and the switch plate 38, while in contact with the contact 43, is bent. If the amount of rise in atmospheric pressure is above 1 mb after the switch plate 38 comes in contact with the contact 43, slippage will occur between the bulges and the switch plate 38. Therefore, the bending of the switch plate 38 will not progress any more and the switch plate is stopped in its bent state. It is to be noted, however, that even after the switch plate 38 is stopped, the bell crank 29 continues to rotate according as atmospheric pressure rises, so that the pointer 13 continues to indicate the value of atmospheric pressure at that time on the dial 14. During this period, the lamp 15a keeps lighting.

If atmospheric pressure, which has risen to a certain value, turns to fall, the hollow assembly 17 begins to expand, rotating the bell crank 29 in a direction L to reduce the amount of bending of the switch plate 38. If the fall in atmospheric pressure reaches 1 mb, the switch plate resumes the perfect flat state and leaves the contact 43 to turn off the lamp 15a and instead, turn on the lamp 15c to represent "atmospheric pressure is falling".

Thereafter, if atmospheric pressure continues to fall until the amount of fall reaches 3 mb, the switch plate 38 comes in contact with the contact 42 to turn off the lamp 15c and, instead, turn on the lamp 15d to represent "it will rain". Thereafter, if atmospheric pressure continues to fall, a bending deformation is produced in the switch plate 38 during the first change of 1 mb, and if the deformation exceeds 1 mb, slippage takes place between the switch plate 38 and the grooved pulley 37. During this period, the lamp 15d continues to light and the pointer 13 continues to indicate the value of atmospheric pressure at that time on the dial 14.

If atmospheric pressure, which has fallen to a certain value, turns to rise until the amount of rise reaches 1 mb, the switch plate 38 leaves the contact 42 to turn off the lamp 15d and, instead, turn on the lamp 15b to represent "atmospheric pressure is rising". Thereafter, if atmospheric pressure continues to rise until the amount of rise reaches 3 mb, the switch plate 38 comes in contact with the contact 43 to turn off the lamp 15b and, instead, turn on the lamp 15a to represent "it will be fine".

If atmospheric pressure turns to fall immediately after the lamp 15a is turned off, the switch plate 38, which has been in contact with the contact 43, leaves the latter to turn off the lamp 15a and, instead, turn on the lamp 15c to represent "atmospheric pressure is falling". If atmospheric pressure turns to rise again, the switch plate 38 comes in contact with the contact 43 to turn on the lamp 15a.

As has been described so far, according to this weather forecasting device, the switch plate 38 moves between the contacts 42 and 43 to assume different positions whereby the four lamps 15 are selectively lighted to automatically give weather forecasts.

The purpose of forming the switch plate 38 of a resilient material to allow the switch plate 38 to bend during an atmospheric pressure change of 1 mb is to eliminate the influences of minute changes in atmospheric pressure which have nothing to do with the weather. Accordingly, it is not absolutely necessary to set the limit at 1 mb. Thus, it may be set at above or below 1 mb, as needed. Further, switching movement of the switch plate has been described as requiring 3 mb. Such value, however, may also be increased or decreased.

Figure 9:
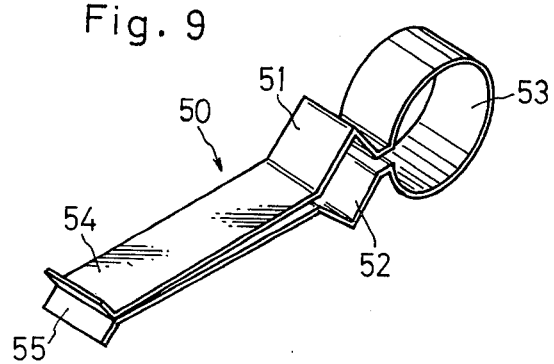
FIG. 9 is an enlarged perspective view of another embodiment of the switch plate.

FIG. 9 shows a switch plate 50 according to another embodiment of the invention. The switch plate 50 has bulges 51 and 52 which are both triangular and a rear portion 53 which is in the form of a single cylinder. In the front end portion 54 of the switch plate 50, two plates are present incontacted overlapping relation and said plates are opened wide at the foremost end 55. Installation of the switch plate 50 on the grooved pulley is effected from the front end.

In the foregoing embodiment, four lamps are used to give weather forecasts. However, such representations by lamps may be replaced by acoustic representations or other representations using a cathode ray tube display. Such modified systems of representation require the use of corresponding display devices.

What is claimed is:
1. A weather forecasting device comprising:
  (a) a device which deforms according to the magnitude of atmospheric pressure,
  (b) a member which transmits the amount of said deformation,
  (c) a bell crank adapted to be rotated by said transmission member,
  (d) a device connected to said bell crank and adapted to indicate values of atmospheric pressure,
  (e) a grooved pulley fixed to the shaft of said bell crank to rotate with rotation of the bell crank,
  (f) a switch plate having both resilience and electric conductivity and attached to the grooved pulley such that normally it is rotated together with the grooved pulley but when it is subjected to a rotation-preventive force exceeding a predetermined limit, slippage takes place between said switch plate and said grooved pulley so that it is no longer rotated with the latter,
  (g) a pair of contacts spaced apart from each other with the front end of the switch plate disposed therebetween,
  (h) a device for representing weather forecasts, and
  (i) electric circuitry designed to set said weather forecast representing device to a predetermined representing mode according to a situation of contact between the switch plate and the two contacts,
the arrangement being such that if there is a change in atmospheric pressure, the switch plate first comes in contact with either of said contacts and then deforms by bending and if there is a greater change in atmospheric pressure, slippage takes place between the switch plate and the grooved pulley.

2. A weather forecasting device as set forth in claim 1, wherein either of said contacts is movable for adjustment of the distance between the contacts.

3. A weather forecasting device as set forth in claim 1, wherein the switch plate is provided with opposed bulges for resiliently clamping the switch plate on the grooved pulley.

4. A weather forecasting device as set forth in claim 1, wherein an aneroid type barometer consisting of a hollow assembly and a spring is used as the device which deforms under atmospheric pressure.

5. A weather forecasting device as set forth in claim 1, wherein the transmission member and bell crank serve to compensate changes in atmospheric pressure to ensure exact proportionality to said changes.

6. A weather forecasting device as set forth in claim 1, wherein the four lamps are individually lighted to give the representations, in steps, "it will be fine", "atmospheric pressure is rising", "atmospheric pressure is falling" and "it will rain".

* * * * *